Dec. 26, 1972    G. R. PERKINS    3,707,406
FASTENER GUIDING DEVICE
Filed Oct. 19, 1970    2 Sheets-Sheet 1

INVENTOR
GARRY R. PERKINS

BY Pendleton, Neuman, Williams
& Anderson
ATTORNEYS

Dec. 26, 1972   G. R. PERKINS   3,707,406
FASTENER GUIDING DEVICE
Filed Oct. 19, 1970   2 Sheets-Sheet 2
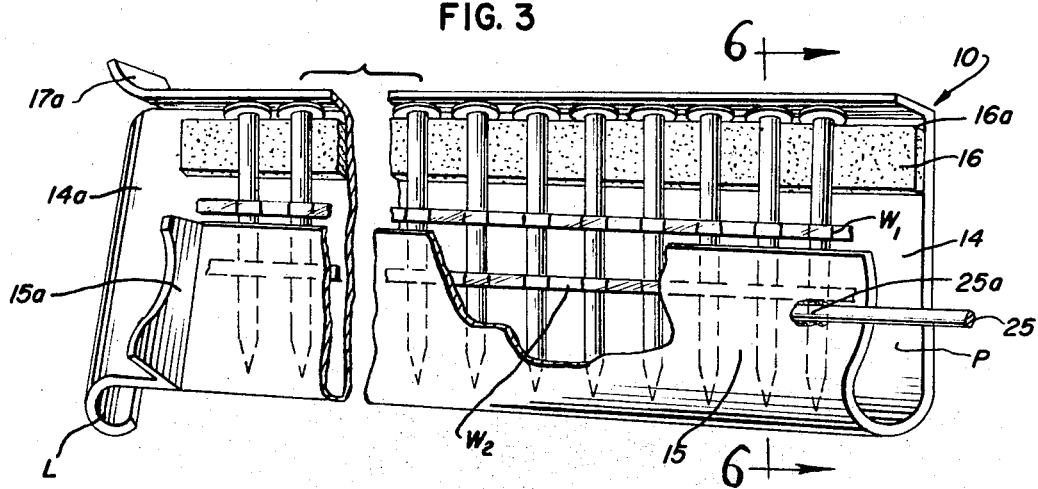
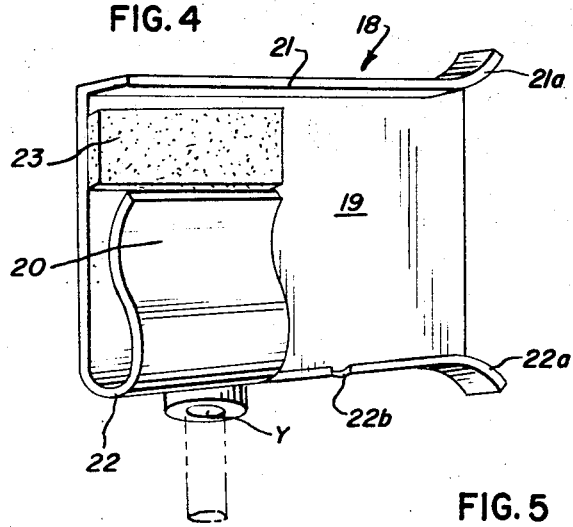
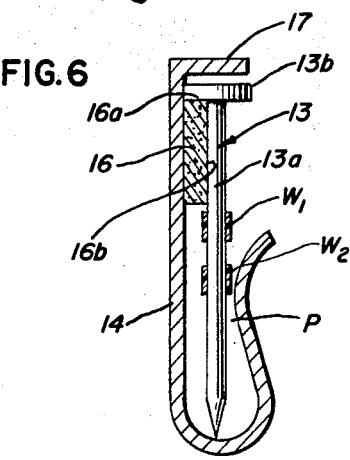
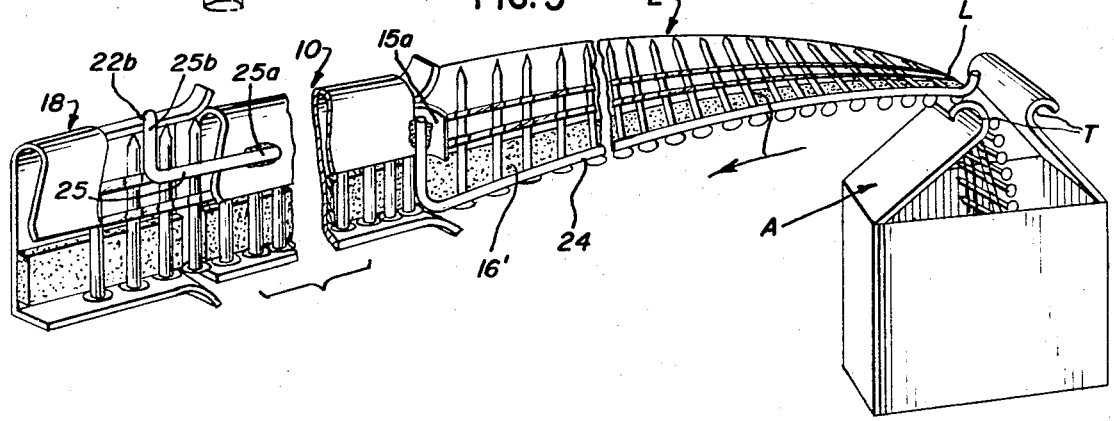
INVENTOR
GARRY R. PERKINS
BY Pendleton, Neuman, Williams & Anderson
ATTORNEYS

United States Patent Office 3,707,406
Patented Dec. 26, 1972

3,707,406
FASTENER GUIDING DEVICE
Garry R. Perkins, Cary, Ill., assignor to Spotnails, Inc.,
Rolling Meadows, Ill.
Filed Oct. 19, 1970, Ser. No. 81,768
Int. Cl. B25c 1/04
U.S. Cl. 227—130                    13 Claims

ABSTRACT OF THE DISCLOSURE

A device is provided for use in guiding a flexible, continuous strip of collated fasteners from a bulk storage container to a high speed power-actuated driving tool spaced from the container. In addition to guiding the collated fasteners from the container to the tool, the device simultaneously orients each fastener into proper position so that it can be readily moved into firing position within the tool, notwithstanding that the axis of the fastener, when being driven by the tool into a workpiece, is angularly disposed relative to the axis of the fastener when the latter was being withdrawn from the container.

BACKGROUND OF THE INVENTION

Various devices, such as magazines or conveyors, for feeding fasteners (e.g., nails) to a pneumatically, hydraulically, or electrically actuated fastener-driving tool have heretofore been utilized; however, because of certain design characteristics they have been beset with one or more of the following shortcomings: (a) they could accommodate only a very limited number of collated fasteners at any one time, thereby requiring frequent reloading thereof, (b) reloading thereof was an awkward and time-consuming operation, (c) they were of bulky construction and thus could not be used in a restricted or compact area, or permit the tool to be disposed in close proximity to another driving tool, (d) they were of complex design and were highly susceptible to becoming out of adjustment and causing jamming of the tool, and (e) they were incapable of accommodating fasteners varying over a wide range in size and shape.

In the rapidly growing prefabricated, or factory built, home industry, the aforenoted shortcomings presented many serious problems, thereby restricting optimum utilization of such tools in many manufacturing operations. For example, because the prior devices required frequent reloading, it was deemed impractical to utilize such tools having high volume fastener usage in locations where the devices were not readily accessible. Such locations frequently resulted where panels were to be simultaneously secured to opposite sides of studs or joists so as to form long continuous walls or floors.

Furthermore, with many prior devices, the problem of fastener jamming was particularly acute when used with high speed tools and where the direction of driving the fasteners into the workpiece required the fasteners to move through a non-rectilinear path while being fed to the tool. Thus, changing the orientation of the fastener axis while being intermittently fed to the tool has heretofore been extremely difficult to accomplish particularly where the strip was of a continuous flexible character.

SUMMARY OF THE INVENTION

Thus, it is an object of this invention to provide a guiding device for a continuous, flexible strip of collated fasteners which readily avoids the aforenoted shortcomings.

It is a further object of this invention to provide a guiding device for a continuous, flexible strip of collated fasteners which permits the strip to be readily withdrawn from a bulk storage container and intermittently fed to a high speed driving tool, and thereby, materially prolong the intervals between reloading of the tool, notwithstanding, that the tool has a high volume fastener usage.

It is a further object of the invention to provide a guide for a flexible strip of collated fasteners which may be shaped so as to enable the tool to assume any desired driving position with respect to the bulk storage container for the fasteners.

It is a still further object of the invention to provide a guide which may be readily attached to a variety of standard pneumatic or electric-driving tools.

It is a still further object of the invention to provide a guide which has a narrow profile and thus, enables the driving tool to be positioned in a compact area, and/or to be utilized in close proximity and in concert with another tool.

It is a still further object of the invention to provide a guide which enables the driving tool to be vertically adjusted without interrupting feeding of the fasteners to the tool.

Further and additional objects will appear from the description, accompanying drawings and appended claims.

In accordance with one embodiment of the invention, a guide for a continuous, flexible strip of collated fasteners is provided which includes elongated first and second members arranged in spaced substantially parallel relation so as to form a narrow elongated passageway through which the fasteners of the strip are adapted to pass. One of the members carries an elongated means for attracting each fastener and causing same to slidably engage said one member while the fastener is passing through the passageway.

DESCRIPTION

FIG. 1 is a fragmentary, perspective side view of an assembly showing a pair of fastener-driving tools arranged in close proximity to one another, a pair of bulk storage containers for strips of collated fasteners wherein the containers are spaced a substantial distance from the tools, and a pair of elongated devices for guiding the strips of collated fasteners while the latter are being fed from the containers to the tools.

FIG. 3 is an enlarged fragmentary, perspective side view of a portion of the guiding device and showing the strip of collated fasteners disposed therein and with the fasteners thereof oriented so that the leading ends thereof face downwardly when being fed into the firing chamber of the driving tool.

FIG. 4 is an enlarged fragmentary, perspective downstream view of a secondary complemental fastener guide unit adapted to be attached to the tool housing and to be used in combination with the device of FIG. 3.

FIG. 5 is a fragmentary, perspective side view of a modified form of the guiding device shown in an assembled relation with a bulk storage container; said device being adapted to change the orientation of the fasteners as they move from the container to the tool.

FIG. 6 is an enlarged, sectional view taken along line 6—6 of FIG. 3.

Figure 1:
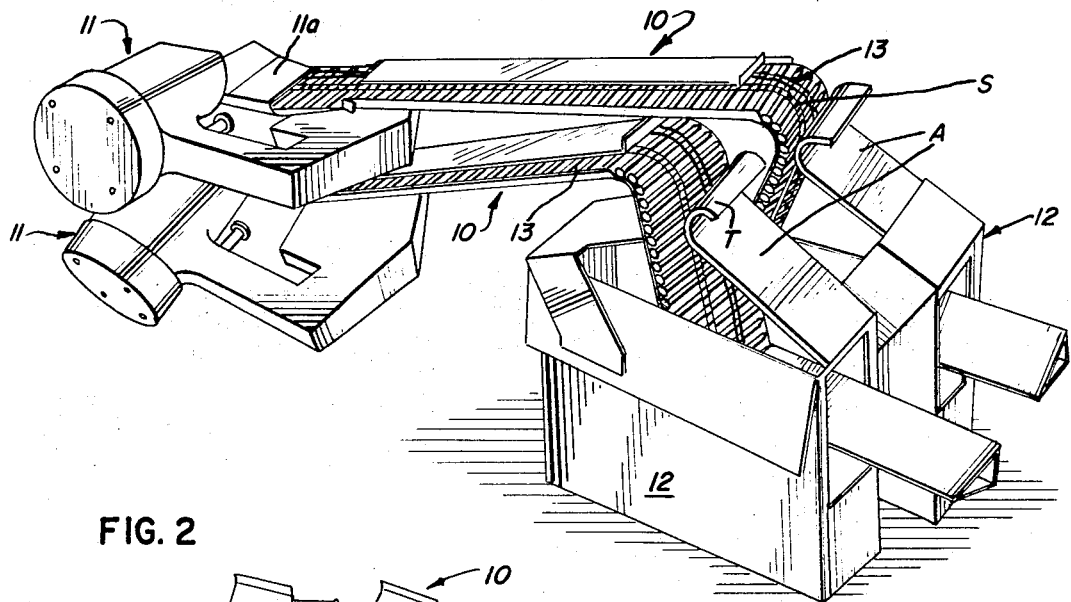
Figure 2:
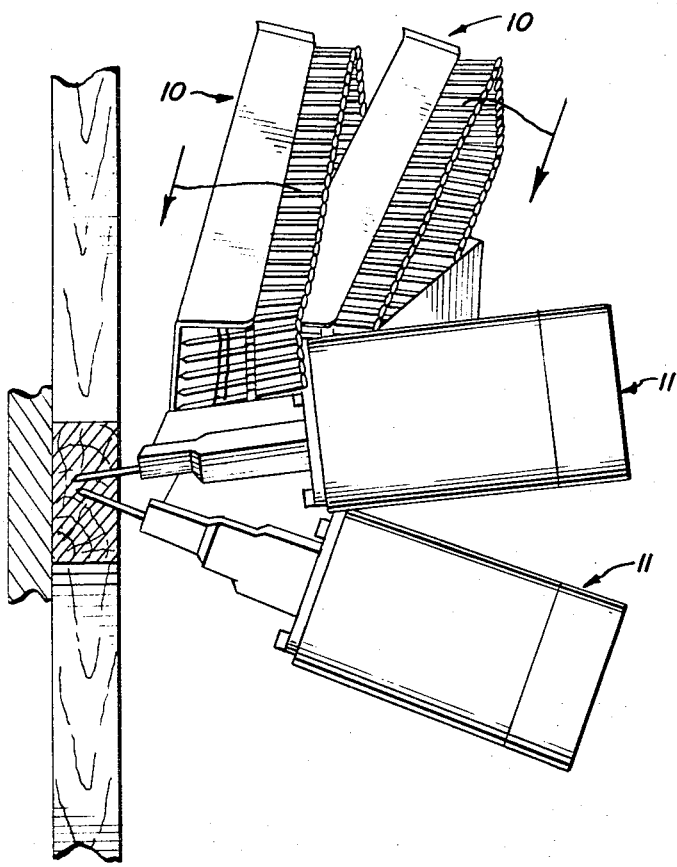
FIG. 2 is a fragmentary, perspective front view of the assembly of FIG. 1 and showing the workpiece in section and with the fasteners fired from the tools partially penetrating the workpiece.

Referring now to the drawings and more particularly to FIGS. 1 and 2, a pair of improved guiding devices 10 of substantially like configuration, are shown in assembled relation with a pair of pneumatically actuated, high speed, fastener-driving tools 11, and a pair of bulk storage containers 12, each of which contains a continuous flexible strip S of collated fasteners 13. The containers 12 preferably are formed from double-faced corrugated board and may be of such size that each container is capable of accommodating a continuous strip S of collated fasteners comprising approximately 10,000 fasteners. The strip S, in each instance, is removed from the container through an opening formed normally in the top thereof and on which is mounted an attachment A. The attachment prevents any binding or snagging of the fasteners on the container walls as they are withdrawn therefrom. The container and attachment may be of the type disclosed in the pending application of Perkins and Goode, Ser. No. 56,419, filed July 20, 1970.

The fasteners 13, illustrated in the drawings, are conventional, round flat head nails which may have a size ranging from six penny to sixteen penny or a length from 2 inches to 3½ inches. The illustrated strip S, see FIGS. 3 and 6, comprises a pair of elongated narrow webs or strands $W_1$ and $W_2$ which are disposed in spaced parallel relation with interconnect the shanks 13a of adjacent fasteners 13. The shanks 13a, in turn, are disposed in spaced parallel relation and are arranged substantially perpendicular to the direction the webs extend. The webs are preferably formed of a thin flexible plastic material and, when they are in extended, taut condition, hold the fasteners of the strip in substantially uniformly spaced parallel relation. The flexibility of the webs permits the strip to be readily distorted while disposed within the container and while being fed from the container to the tool. Thus, in the latter situation, the shanks of the collated fasteners will be properly oriented for feeding into the firing chamber, notwithstanding that the direction of firing the fasteners by the tool is askew to the orientation of the fasteners as they are withdrawn from the storage container. Unless the flexible strips S are properly guided while moving from the storage container to the driving tool, jamming of the tool will frequently occur particularly when the tool is operating at high speeds and the distance the fasteners must travel is substantial. The relative locations of the tool and storage container and the orientation of the fastener when it is being driven by the tool as compared to when it is being removed from the container, determine whether the guiding device 10 will have a substantially rectilinear configuration (FIGS. 1 and 2) or a substantially curvilinear configuration (FIG. 5).

Guide device 10, as shown in FIGS. 1–3, is formed preferably of metal which may be either bent or extruded into a substantially U-shape with one of the leg sections (or walls) 14 extending beyond the other 15. The leg sections 14 and 15 cooperate with one another to form a narrow passageway P through which the collated fasteners 13 are caused to pass as they are being fed from the container 12 to the tool 11. The width of the passageway is such that the fasteners can pass therethrough only in single file thereby avoiding jamming of the fasteners within the passageway.

Secured to leg section 14 is an elongated magnetic member 16 which is disposed parallel to the direction of travel of the fasteners through the passageway. In the embodiment shown in FIG. 3, member 16 comprises a strip of magnetic tape which is bonded to the inner surface of section 14.

The upper edge 16a of the strip 16 is straight and is spaced downwardly from the upper edge of the leg section so as to form a ledge which is slidably engaged by the round heads 13b of the fasteners 13 as they move through the passageway.

The width or vertical dimension of the strip 16 is such that it provides a substantial surface 16b against which the shanks 13a of the fasteners are attracted and slide over as the fasteners move through the passageway. The surface 16b is substantially flat and provides a small amount of drag friction thereby imparting tautness to the strip and thus, proper spacing between adjacent fasteners.

The upper edge of leg section 14 is offset inwardly so as to form a short flange 17 which functions as a stop for the head ends of the fasteners in the event the guide device 10 or a portion thereof is required to become inverted from that as shown. Such situation might occur if the direction of firing the fasteners by the tool was upwardly rather than downwardly.

The end of the flange 17, adjacent the infeed end of the passageway P, is flared outwardly a slight amount to form a lip 17a, so as to facilitate entry of the fasteners into the passageway. Sometimes the fasteners of the strip S are not in proper vertical and horizontal alignment in which case the flared lip 17a will compensate for this fact by directing the head 13b of the misaligned collated fastener downwardly beneath the flange 17 so that the head will engage the upper edge 16a of the strip 16.

To further facilitate entry of the fasteners into the passageway P, particularly where one of the collated fasteners is out of alignment, the end 15a of leg section 15 adjacent the passageway entry is also outwardly flared.

The end 14a of leg section 14, which is adjacent the entry to the passageway, extends longitudinally beyond the end 15a and terminates in an outwardly directed half loop L. The loop L is of such a configuration that it is adapted to adjustably engage a throat portion T of the attachment A mounted on the discharge end of container 12, see FIG. 5. By reason of the flared configuration of the throat portion T and the complemental loop configuration 14a, the guide member 10 may be pivoted about a horizontal axis utilizing the throat portion T as a fulcrum and thus, permits the tool 11 to be adjusted to compensate for the thickness variations of the workpiece into which the fasteners are to be driven.

As seen in FIG. 3, the leg section 15 extends approximately mid-height of leg section 14. The downstream end of the device 10, shown in FIG. 3, may be interfitted with the feed mechanism 11a of the tool, see FIG. 1, or with a secondary guide unit 18, as seen in FIG. 5. Unit 18 is illustrated in FIG. 4 and has a vertical cross-sectional configuration which is similar to that of device 10; that is to say it is substantially U-shaped and has leg sections 19 and 20 which are similar to leg sections 14 and 15, respectively. Leg section 19 has a transversely extending flange 21 formed on the upper edge thereof. The upstream end of flange 21 is flared outwardly at 21a. The base section 22 of unit 18, which interconnects the lower edges of leg sections 19 and 20, projects longitudinally rearwardly and terminates at 22a in an outward flare. Thus, the flaring at 21a and 22a facilitates a sliding interfitting between the adjecent ends of device 10 and unit 18.

The inner surface of section 19 may be provided with a piece of magnetic tape 23 which is similar to the magnetic tape 16 secured to the inner surface of leg section 14. Strips 16 and 23 are in longitudinal alignment with one another when device 10 and unit 18 are in interfitted relation. Both strips serve the same function; namely, to maintain the collated fasteners in proper orientation while slidably moving thereacross.

Unit 18 may be secured to the tool housing by a suitable pin Y carried on the exterior surface of section 19. The pin is adapted to fit within a suitable socket, not shown, formed in the tool housing. Because of the pin and socket connection, the unit 18 can be pivotally adjusted to various positions with respect to the tool.

In FIG. 5, device 10 is shown with the upstream end portion E thereof having a curvilinear configuration which is attained by the leg section 14 extending longitudinally a substantial distance beyond the end 15a of section 15. This extended portion is substantially the same width as leg section 14, but as the portion E continues rearwardly or in a direction opposed to the direction of movement of the collated fasteners, it assumes a gentle twist of approximately 90° whereupon it finally terminates in a depending loop L which, in turn, pivotally engages the throat portion T of the container attachment A, see FIG. 5.

Secured to the upstream end 15a of leg section 15 of device 10 and extending substantially longitudinally therefrom is an elongated rod 24. The rod is spaced uniformly from the inner surface of the extension E and serves to guide the collated fasteners against the said inner surface where they are attracted to the magnetic tape piece 16' mounted on said surface. The rod may be distorted so as to conform to the curvature of the inner surface of the extension E.

While device 10 and the secondary unit 18 are shown as being provided with sections of magnetic tape 16 and 23, other means may be provided to produce the magnetic attraction for the collated fasteners, as required. For example, an elongated magnetic bar may be attached to either the outer or inner surfaces of the leg sections 14 and 19. Where the bar is attached to the outer surface of section 14 or 19, a slot or indentation, not shown, may be formed in the leg section adjacent the flange 17 or 21 in order to accommodate the heads of the fasteners.

As shown in FIG. 5, device 10 and unit 18 may be retained in interfitting relation by means of an elongated longitudinally extending finger 25 which has one end 25a thereof secured to the exterior of leg section 15 and the other end 25b offset upwardly for disposition within a notch 22b formed in unit 18, see FIG. 4. Other means may be utilized to retain the device and unit in interfitting relation.

The direction and extent of the twist or curvature of the extension E of device 10 will depend upon the change in orientation of the fasteners required. Various other fasteners, such as screws or the like, may be accommodated by the improved guiding device.

Thus, it will be seen that a device has been provided which enables a continuous, flexible strip of collated fasteners to be readily guided from a bulk storage container or the like to a remotely disposed high speed power actuated fastener-driving tool. The device is of simple, yet sturdy construction, is capable of accommodating a variety of types of fasteners, and enables the orientation of the fasteners to change as they are being fed to the tool.

I claim:

1. A guide for a continuous flexible strip of collated fasteners when the strip is fed so as to move in a longitudinal direction, the fasteners of the strip having elongated shanks arranged in spaced substantially parallel relation and interconnected by a flexible web; said guide comprising an elongated first member; and elongated second member disposed in spaced substantially parallel relation with respect to said first member and cooperating therewith to form an elongated narrow passageway through which the individual fasteners of the strip are adapted to successively pass, said members being interconnected along corresponding elongated edges and forming a transverse wall adapted to be spaced from one end of a fastener while the latter is passing through said passageway, the opposite edge of one of said members being transversely offset and substantially overlying in spaced relation an adjacent edge of the other member and the opposite end of the fastener when the latter is moving through the passageway; and means carried by one of said members for effecting slidable engagement between the fastener shanks and the passageway-forming surface of said one member while the fasteners are passing through said passageway.

2. The guide of claim 1 wherein the fasteners are of ferrous material and a magnetic element is mounted on the passageway forming surface of said one member and is adapted to be slidably engaged by each fastener moving through said passageway.

3. The guide of claim 2 wherein each fastener has an enlarged head formed at the trailing end of the shank and said magnetic element has one edge thereof forming an elongated ledge for supporting engagement with the enlarged head while the fastener is passing through said passageway.

4. The guide of claim 1 wherein said passageway has an inlet and an outlet, said inlet being defined by an outwardly flared edge of one member, and an elongated longitudinally projecting extension formed on the other member, said extension terminating in an outwardly projecting open loop configuration.

5. The guide of claim 4 including an elongated rod being disposed in spaced substantially parallel relation with said extension for urging the moving fasteners against a surface of said extension.

6. The combination of a powed actuated fastener-driving tool having a fastener-firing cavity; means for successively feeding fasteners from a continuous flexible strip of collated fasteners into said cavity, the fasteners of the strip having shanks of magnetically attracted material arranged in spaced substantially parallel relation; a bulk storage container for the collated fasteners separate from said driving tool and disposed in a remote location with respect thereto, said container having an opening through which the strip of collated fasteners is withdrawn; and an elongated guide being provided with an elongated surface against which the fastener shanks are adapted to be in continuous sliding engagement while moving from said container to said driving tool, said elongated surface having an elongated magnetic strip mounted thereon for sliding engagement by said fasteners.

7. The combination of claim 6 wherein said guide surface has one end thereof adjustably connected to the container discharge opening.

8. The combination of claim 6 wherein said guide effects change of plane of the collated fasteners while the latter are moving from said container to said fastener-firing cavity.

9. The combination of claim 6 wherein each collated fastener includes an enlarged head portion affixed to the trailing end of the shank; one edge of said magnetic strip forming a supporting ledge for the head portions while the fasteners are moving along said guide, said magnetic strip imparting a frictional drag to the shank of each moving fastener.

10. The combination of claim 9 wherein said guide includes a second surface disposed in spaced substantially parallel relation with respect to the surface on which said magnetic strip is mounted, said second surface cooperating with said magnetic strip to form a narrow elongated passageway through which the fasteners are adapted to pass.

11. The combination of claim 10 wherein said guide surfaces are interconnected by an elongated narrow wall which is adapted to be spaced from the leading ends of the shanks of said fasteners while the latter are passing through said passageway.

12. The combination of claim 6 wherein said elongated guide is of sectional construction and includes an elongated upstream section having one end thereof adjustably connected to the container opening and the other end thereof in interfitting engagement with one end of a downstream section, said downstream section orienting the fasteners for successive feeding thereof into said fastener-firing cavity.

13. The combination of claim 12 wherein said guide downstream section is removably connected to said fastener-driving tool.

References Cited

UNITED STATES PATENTS

| 539,065 | 5/1895 | Lombard | 227—116 |
| 3,285,489 | 11/1966 | Lingle | 227—113 |
| 3,330,462 | 7/1967 | Colechia et al. | 227—136 |

GRANVILLE Y. CUSTER, JR., Primary Examiner

U.S. Cl. X.R.

227—136, 114

UNITED STATES PATENT OFFICE
CERTIFICATE OF CORRECTION

Patent No. 3,707,406                     Dated December 26, 1972

Inventor(s) GARRY R. PERKINS

It is certified that error appears in the above-identified patent and that said Letters Patent are hereby corrected as shown below:

Column 3, line 18 "with" should be and

Column 6, line 11 (claim 6) "powed"

should be power

Signed and sealed this 17th day of April 1973.

(SEAL)
Attest:

EDWARD M. FLETCHER, JR.
Attesting Officer

ROBERT GOTTSCHALK
Commissioner of Patents